United States Patent
Seo et al.

(10) Patent No.: US 12,098,040 B2
(45) Date of Patent: Sep. 24, 2024

(54) SUPPLY DEVICE

(71) Applicant: INSSTEK, INC., Daejeon (KR)

(72) Inventors: Suk Hyun Seo, Daejeon (KR); Seung Jun An, Daejeon (KR)

(73) Assignee: INSSTEK, INC., Daejeon (KR)

( * ) Notice: Subject to any disclaimer, the term of this patent is extended or adjusted under 35 U.S.C. 154(b) by 0 days.

(21) Appl. No.: 17/769,168

(22) PCT Filed: Oct. 20, 2020

(86) PCT No.: PCT/KR2020/014324
§ 371 (c)(1),
(2) Date: Apr. 14, 2022

(87) PCT Pub. No.: WO2021/080287
PCT Pub. Date: Apr. 29, 2021

(65) Prior Publication Data
US 2024/0109737 A1    Apr. 4, 2024

(30) Foreign Application Priority Data

Oct. 25, 2019 (KR) .......... 10-2019-0133878
Oct. 15, 2020 (KR) .......... 10-2020-0133213

(51) Int. Cl.
*B65G 65/40* (2006.01)

(52) U.S. Cl.
CPC ........ *B65G 65/40* (2013.01); *B65G 2201/042* (2013.01)

(58) Field of Classification Search
CPC .......... B65G 65/40; B65G 2201/042
See application file for complete search history.

(56) References Cited

U.S. PATENT DOCUMENTS

| | | | |
|---|---|---|---|
| 2009/0288600 A1* | 11/2009 | Lee | ........ C23C 14/246 118/715 |
| 2018/0141126 A1* | 5/2018 | Buller | ........ B29C 64/153 |

FOREIGN PATENT DOCUMENTS

| CN | 107014456 A | * | 8/2017 |
|---|---|---|---|
| CN | 109625486 A | * | 4/2019 |
| JP | H08253202 A | * | 10/1996 |
| JP | H11227888 A | * | 8/1999 |
| KR | 20-0293288 Y1 | | 10/2002 |
| KR | 10-2006-0037974 A | | 5/2006 |

(Continued)

OTHER PUBLICATIONS

International Search Report for PCT/KR2020/014324 mailed Feb. 2, 2021 from Korean Intellectual Property Office.

*Primary Examiner* — Bob Zadeh
(74) *Attorney, Agent, or Firm* — Paratus Law Group, PLLC (57) ABSTRACT

A supply device for supplying powder, includes: a storage part in which the powder is stored; a supply control part which is provided such that the stored powder flows therein and remains therein, and from which the powder is discharged by external force; and a supply driving part which provides force to the supply control part. The supply driving part includes a control period in which a moving speed is increased and then reduced in a process of reciprocating the supply control part. The control period is set to perform a movement by a distance which is obtained by excluding or adding a predetermined distance from or to a total distance in the process of reciprocating the supply control part.

4 Claims, 4 Drawing Sheets

(56) References Cited

FOREIGN PATENT DOCUMENTS

| | | | |
|---|---|---|---|
| KR | 10-2009-0103481 A | 10/2009 | |
| KR | 10-2011-0139165 A | 12/2011 | |
| KR | 101523437 B1 * | 5/2015 | |
| KR | 10-2016-0124710 A | 10/2016 | |
| KR | 10-2018-0001932 A | 1/2018 | |
| KR | 10-1873291 B1 | 7/2018 | |
| WO | WO-03099032 A1 * | 12/2003 | ............. A23P 20/17 |

* cited by examiner

SUPPLY DEVICE

CROSS-REFERENCE TO PRIOR APPLICATIONS

This application is a National Stage Patent Application of PCT International Patent Application No. PCT/KR2020/014324 (filed on Oct. 20, 2020) under 35 U.S.C. § 371, which claims priority to Korean Patent Application Nos. 10-2019-0133878 (filed on Oct. 25, 2019) and 10-2020-0133213 (filed on Oct. 15, 2020), which are all hereby incorporated by reference in their entirety.

BACKGROUND

The present disclosure relates to a powder supply device and, more particularly, to a supply device capable of stably supplying a fixed amount of powder.

The present disclosure is directed to a common supply device or vibrating feeder.

As the related art, Korean Patent Laid-Open Publication No. 10-2006-0037974 (published on May 3, 2006 and entitled "Vibrating feeder for BTP process") has disclosed a vibrating feeder for a BTP process, including a feeding pipe which has an inlet port and an outlet port at front and rear ends thereof and is installed to extend horizontally; a plurality of spring brackets which are formed on each of the front and rear ends of the feeding pipe such that one pair protrudes integrally to the left and right; a spring mounted on a bottom of the spring bracket; first and second brackets which protrude perpendicularly from central portions of both side surfaces of the feeding pipe; a vibrating motor mounted on the central portion of the outer surface of each of the first and second brackets; and an electronic control part which controls the operation of the vibrating motor.

As the related art, Korean Patent Laid-Open Publication No. 10-2009-0103481 (published on Oct. 1, 2009 and entitled "Vibrating feeder for powder coating") has disclosed a vibrating feeder for powder coating, including a vibrating container 10 composed of an outer container 11 and an inner container 12, a vibration generator 8 connected to the vibrating container 10, an input port 16 formed on a top of the vibrating container 10 such that an object 1 to be coated falls into and is put into the central portion of the container, an outlet hole 22 which is formed in a periphery of a bottom of the inner container 12, a passage member 24 which is disposed between the outer container 11 and the inner container 12 and extends spirally from the bottom to the top, and a discharge hole 23 which is formed in the outer container 11 to communicate with the upper end of the passage member 24. A diffusion member 30 having a conical surface 31 or a curved surface 32 is provided on the center of the inner container 12 so that the falling object 1 collides and diffuses.

As the related art, Korean Patent Laid-Open Publication No. 10-2016-0124710 (published on Oct. 28, 2016 and entitled "Trough device for vibrating feeder") has disclosed a trough device for a vibrating feeder configured to move raw material, which is supplied by a vibrating feeder for large and small feed and a vibrating feeder for large feed installed in front of the vibrating feeder for large and small feed, to the front and thereby put the raw material into a metering part. This includes a supply part, a trough for large and small feed, and a trough for large feed. The supply part includes a first bottom which is configured such that a lower surface thereof is seated on the upper surface of the vibrating feeder for large feed and small feed, a first left wall which is configured such that a lower end thereof is coupled with the left end of the first bottom to be erected, a first right wall which is configured such that a lower end thereof is coupled with the right end of the first bottom to be erected, and a first rear wall which is configured such that a lower end thereof is coupled with the rear end of the first bottom to be erected, has an internal space surrounded by the first bottom, the first left wall, the first right wall, and the first rear wall, and is opened at a front surface and an upper surface thereof. The trough for large and small feed is coupled with the front end of the first bottom to extend forwards. The trough for large and small feed is configured such that a rear end thereof is coupled with the front end of the supply part, and includes a width narrowing part configured such that left and right edges get closer to a center of the left and right sides as they go forwards and thereby a transverse width is reduced, and a small feed transfer part configured such that a rear end is coupled with the front end of the width narrowing part and extending forwards while having a constant transverse width. The trough for large feed is positioned under the trough for large and small feed, and includes a second bottom configured such that a lower surface thereof is seated on the upper surface of the vibrating feeder for the large feed, a second left wall configured such that a lower end thereof is coupled with the left end of the second bottom to be erected, a second right wall configured such that a lower end thereof is coupled with the right end of the second bottom to be erected, and a second rear wall configured such that a lower end thereof is coupled with the rear end of the second bottom to be erected, and has an internal spaced surrounded by the second bottom, the second left wall, the second right wall, and the second rear wall, and is opened at a front surface and an upper surface. Thereby, the trough for large feed is supplied with raw material which flows down from the left and right edges of the width narrowing part, and then discharges the raw material through a front edge of the second bottom to the metering part. The front end of the small feed transfer part is positioned in front of the front end of the second bottom.

As in Korean Patent Laid-Open Publication No. 10-2016-0124710 (published on Oct. 28, 2016 and entitled "Trough device for vibrating feeder"), the vibrating feeder used in a shaping device such as a 3D printer moves an object (powder, etc.) supplied through an object supply device to the outside by vibration and evenly spreads the object, thus keeping an amount discharged to the outside according to the moving speed of the object constant.

Such a conventional vibrating feeder requires a sufficient moving distance to evenly spread the object, thereby allowing a fixed amount of object to be discharged. In other words, in order to discharge a fixed amount of object, the object should be sufficiently moved by vibration. To this end, a preparation process or preparation time for discharging a specific fixed amount of object is required.

SUMMARY

The present disclosure provides a supply device which does not require a preparation process or preparation time for discharging a specific amount.

In an aspect, a supply device is disclosed.

The supply device for supplying powder 10 may include a storage part 310 in which the powder 10 is stored, a supply control part 320 which is provided such that the stored powder 10 flows therein and remains therein, and from which the powder 10 is discharged by external force, and a supply driving part 330 which provides force to the supply control part 320.

The supply driving part 330 may include a control period 20 in which a moving speed is increased and then reduced in a process of reciprocating the supply control part 320.

The control period 20 may be set to perform a movement by a distance which is obtained by excluding or adding a predetermined distance from or to a total distance in the process of reciprocating the supply control part 320.

The supply driving part 330 may include a motor 331, a crank 332 performing a reciprocating movement by rotating force of the motor 331, and a motor control part 333 controlling the control period 20 in which a moving speed of the motor 331 is increased and then reduced in the process of reciprocating the supply control part 320.

The supply device disclosed in the present specification can finely control the amount of powder 10 supplied to the powder discharge part 100 through the amount of the powder 10 discharged by the control period 20.

The supply device disclosed in the present specification provides irregular inertia by changing a speed when the supply control part 320 is moved from the bottom to the top and then from the top to the bottom by the motor control part 333. The fluidization of the powder 10 can be suppressed by the irregular inertia.

DETAILED DESCRIPTION

Hereinafter, embodiments of the present disclosure will be described in detail with reference to the accompanying drawings. The same reference numerals are used throughout the drawings to designate the same or similar components. It is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure. Those skilled in the art may easily understand that components of the present disclosure, i.e., components generally described herein and illustrated in the drawings may be arranged, configured, combined, and designed in various ways, all of them are clearly contemplated and form a part of the present disclosure. In order to clearly express several layers (or films), areas and shapes in the drawing, the width, length, thickness or shape of components may be exaggerated.

When a first component is disposed on a second component, the first component may be not only directly on the second component but a third part may be interposed between them.

When a first component is connected to a second component, the first component may be not only directly connected to the second component but a third part may be interposed between them.

When a first component is formed on a second component, the first component may be not only directly formed on the second component but a third part may be interposed between them.

When a first component is combined with a second component, the first component may be not only directly combined with the second component but a third part may be interposed between them.

Specific structural or functional descriptions in the embodiments of the present disclosure introduced in this specification or application are only for description of the embodiments of the present disclosure. The descriptions should not be construed as being limited to the embodiments described in the specification or application. The present disclosure may, however, be embodied in many different forms and should not be construed as being limited to only the embodiments set forth herein, but should be construed as covering modifications, equivalents or alternatives falling within ideas and technical scopes of the present disclosure.

In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

A supply device 300 is provided to supply the powder 10 to the powder discharge part 100. The supply device 300 may mainly include a storage part 310 in which the powder 10 is stored, a supply control part 320, and a supply driving part 330.

Figure 1:
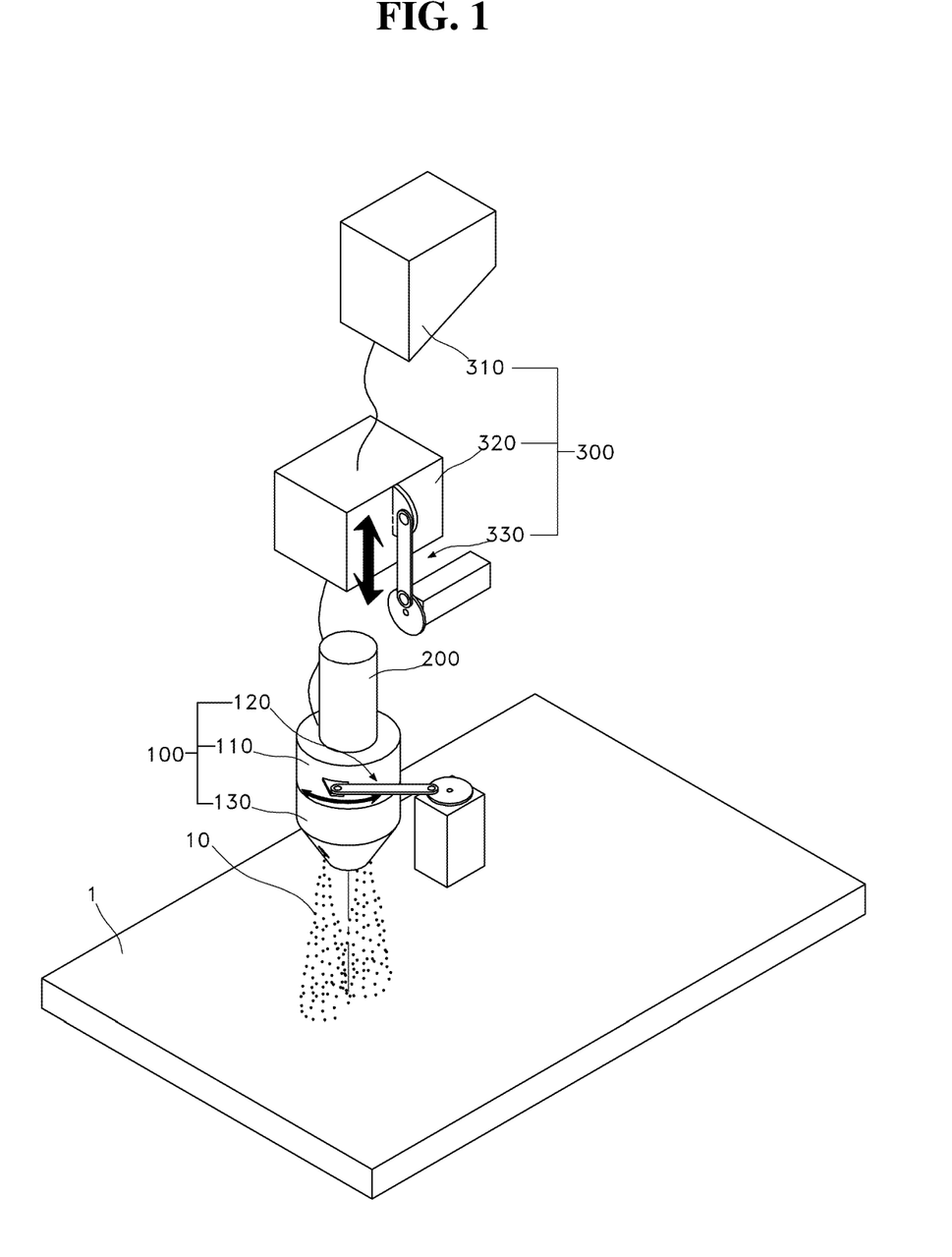
FIG. 1 is a diagram schematically illustrating an entire supply device disclosed in this specification.

In an example, referring to FIG. 1, the storage part 310 may be provided as a general container in which the powder 10 is stored. The storage part 310 is connected to the supply control part 320 to allow the powder 10 to be naturally introduced into the supply control part 320. A connection of the storage part 310 and the supply control part 320 may be provided as a general hose.

Figure 2:
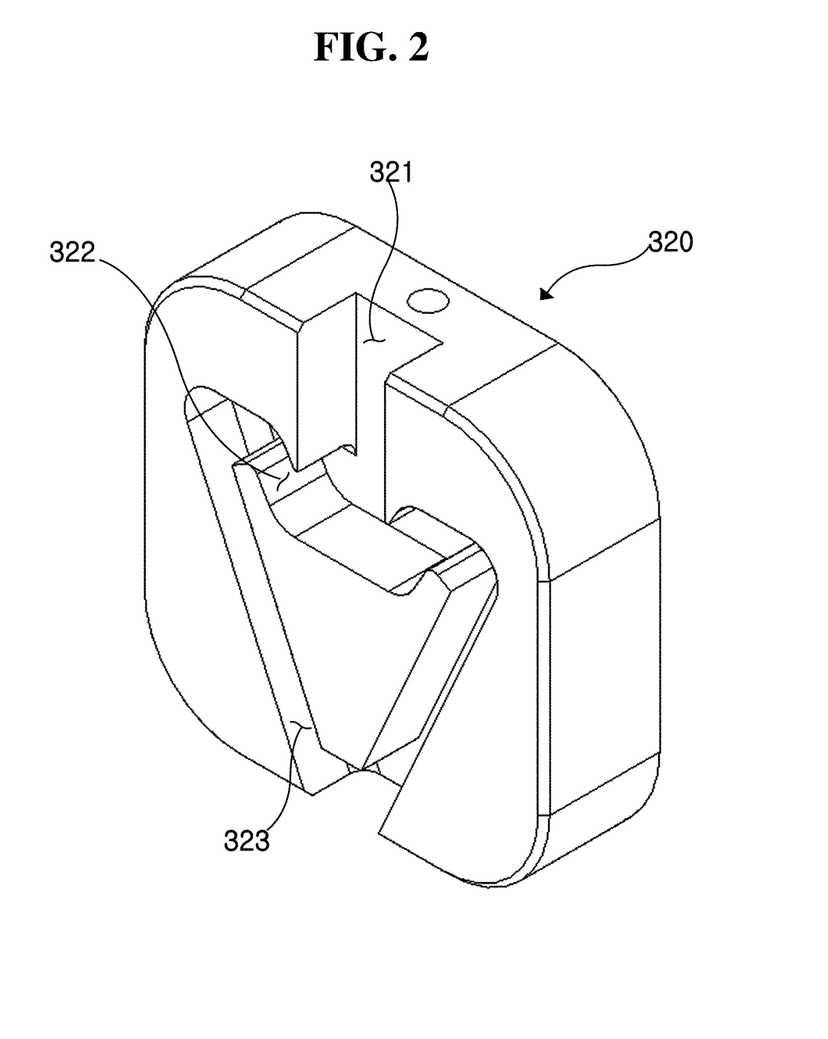
FIG. 2 is a diagram illustrating the section of a supply control part disclosed in this specification.

In an example, referring to FIG. 2, the supply control part 320 may be provided to allow the stored powder 10 to be introduced and stay therein. The supply control part 320 may be provided to discharge the powder 10 by external force. The supply control part 320 includes a passage through which the powder 10 is introduced and discharged, and the direction of the passage is changed at least twice or more. In detail, the supply control part 320 may mainly include an inlet passage 321, a control passage 322, and a supply passage 323.

The inlet passage 321 may be provided in the vertical direction. The inlet passage 321 is filled with the powder 10 which is naturally introduced from the storage part 310.

The control passage 322 may be provided as a passage which is connected to the lower portion of the inlet passage 321 and is inclined upwards in the transverse direction. In other words, the control passage 322 may be formed in the shape of an "L" together with the inlet passage 321, and may be provided such that an end thereof in the transverse direction is inclined upwards. The control passage 322 is inclined at an end thereof upwards to allow the powder 10 introduced into the inlet passage 321 to stay therein.

On the other hand, the control passage 322 may be connected at a central portion thereof to the inlet passage 321, and may be provided such that both ends thereof in the transverse direction are inclined upwards. In other words, the control passage 322 is provided to have a 'V'-shaped section. The control passage 322 forms a closed model in which the powder 10 may naturally stay, after it is fed from the storage part 310 to the supply control part 320.

Meanwhile, when there is no external force, the control passage 322 may be provided to have a sectional area in which the particles of the powder 10 may be aggregated and stay in the supply passage 323 due to Van der Waals force, friction between the particles, or friction between the particles and the supply passage 323.

The supply passage 323 may be provided as a passage which is connected to the control passage 322 and faces downwards. The supply passage 323 induces the natural falling motion of the powder 10 passing through the control passage 322. When there is no external force, the supply passage 323 may be provided to have a sectional area in which the particles of the powder 10 may be aggregated and stay in the supply passage 323 due to Van der Waals force, friction between the particles, or friction between the particles and the supply passage 323.

Meanwhile, the supply passage 323 may be provided to be connected to both ends of the 'V'-shaped control passage 322 and be merged at the bottom. In other words, the supply passage 323 is provided in the 'V' shape.

Meanwhile, the control passage 322 and the supply passage 323 of the supply control part 320 through which the powder 10 is discharged may selectively adopt a size, the size or shape of a section or the direction of a path, depending on the particle shape and size of the powder 10 or material properties.

The supply control part 320 forms a closed model in a path where the powder 10 is supplied from the storage part 310 and then discharged, and prevents the powder 10 from flowing when there is no external force from the supply driving part 330. The close model changes the size of a path or passage where the particles of the powder 10 may move, the shape of a section or the direction of the path, thus preventing the powder 10 from flowing in the supply control part 320 due to various factors such as the friction between particles or the friction between the particles of the powder 10 and the passage, and the stress between the particles of the powder 10. The control passage 322 shown in the drawing is an example where the direction of a path along which the particles of the powder 10 may move is changed, and the supply passage 323 is an example where the direction of a path along which the particles may move and the size of the passage are changed. In other words, the supply control part 320 is configured to discharge the powder only when external force is applied.

The powder 10 introduced from the supply part 310 stays in the supply control part 320 disclosed in the example. In detail, the powder 10 stays in the inlet passage 321 and the control passage 322. The staying powder 10 may be introduced into the supply passage 323 only when external force acts thereon. To be more specific, the powder 10 which is the fine particle is filled in the inlet passage 321 and the control passage 322. In this state, the powder stays when there is no external force. However, when a distance between the particles is increased by external force, friction or stress between the particles is reduced, resulting in a fluidization phenomenon where the particles flow from a high place to a low place, like fluid. At this time, there occurs a residual flow in which a small amount of powder 10 flows due to the fluidization phenomenon even if the external force is eliminated.

Figure 3:
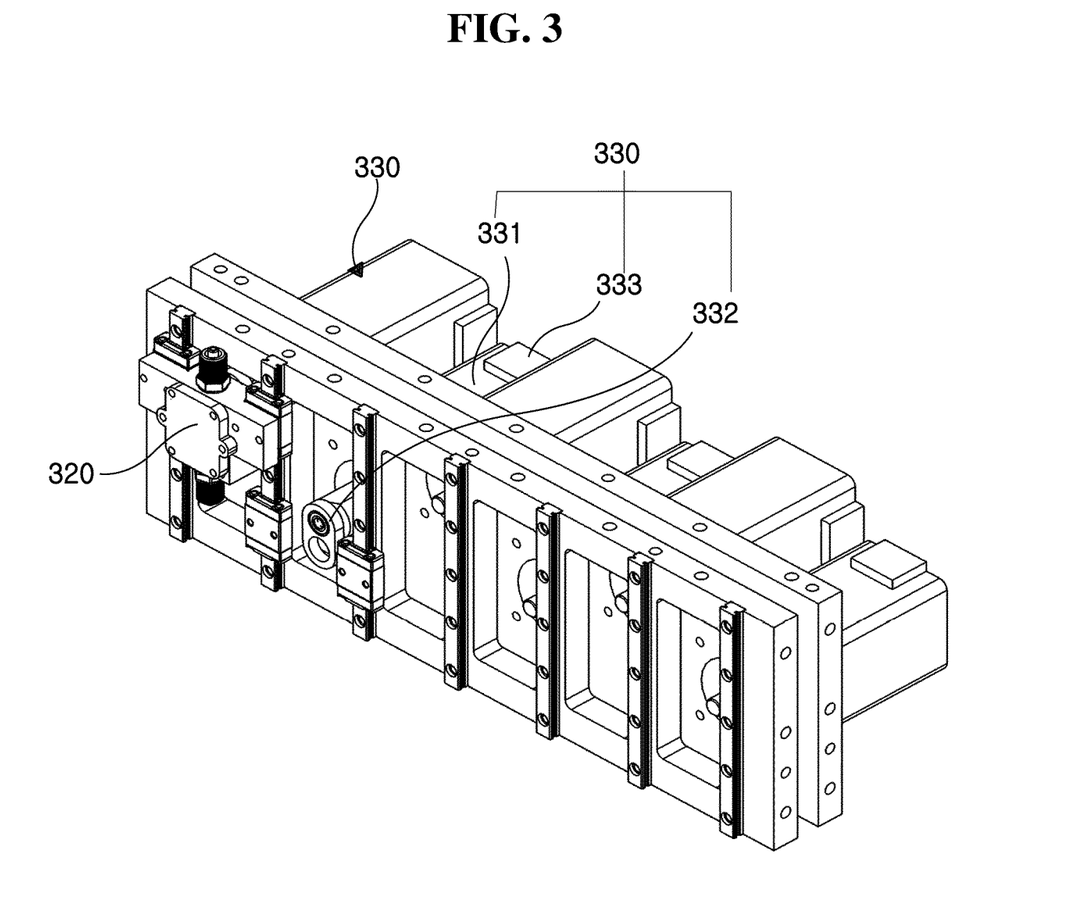
FIG. 3 is a diagram illustrating a supply driving part disclosed in this specification.

In an example, referring to FIG. 3, the supply driving part 330 may be provided to repeatedly move the supply control part 320 upwards and downwards. The supply control part 320 prevents the powder 10 from staying, thus allowing the powder 10 to be moved in the supply control part 320. In detail, the supply driving part 330 may mainly a general motor 331, a general crank 332, and a motor control part 333.

The motor 331 may be provided as a general servomotor that may control pulses.

The crank 332 may be provided to repeatedly move the supply control part 320 upwards and downwards by the rotating force of the motor 331.

In the case of implementing the motor 331 and the crank 332, the motor 331 performs a rotary motion and the supply control part 320 connected to the crank 332 performs a linear motion. In this case, even when the motor 331 operates at a constant speed, the supply control part 320 connected to the crank 332 continuously changes a movement direction and a movement speed.

Figure 4:
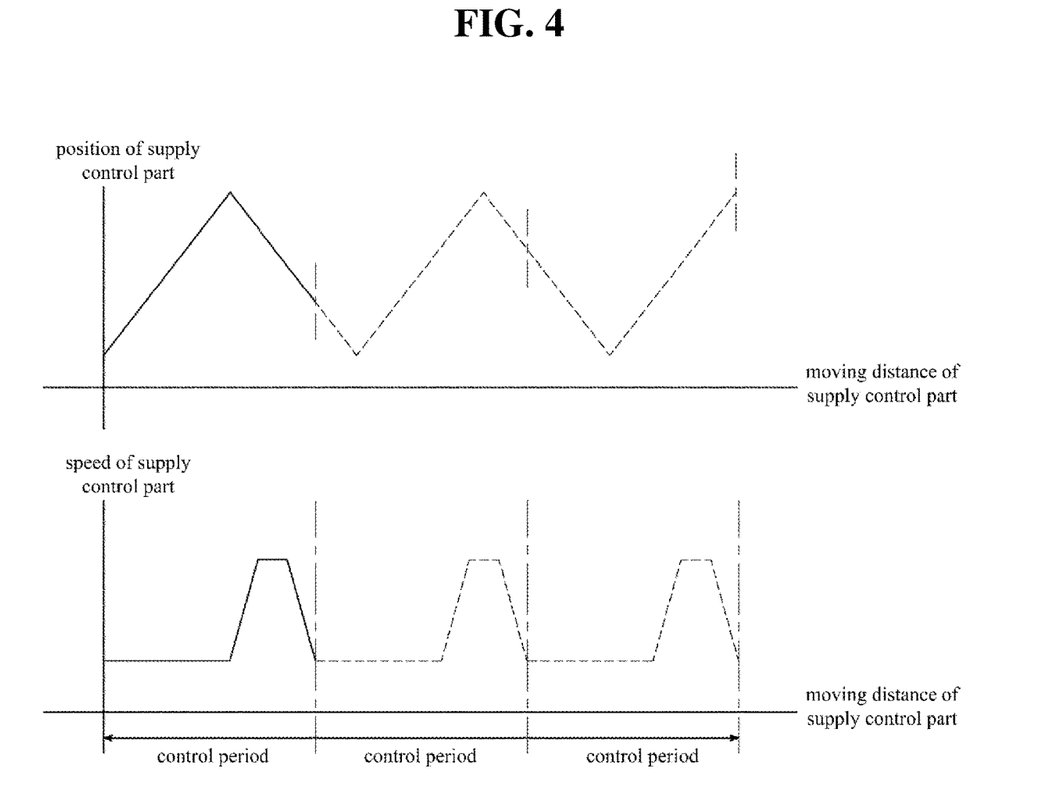
FIG. 4 is a graph illustrating a relationship between time and the position of the supply control part and according to another example of a motor control part.

Referring to FIGS. 3 and 4, the motor control part 333 is provided to divide the rotating angle (360°) of a shaft of the motor 331 into a specific angle and to be rotated at a separate speed. The motor control part 333 may include a control period 20 where the operating speed of the motor 331 is increased once and then reduced once in a process where the supply control part 320 is reciprocated. The reciprocating movement means that the supply control part 320 is moved from the bottom to the top, then again to the bottom or from the top to the bottom, and then again to the top.

In other words, the motor control part 333 implements a section in which the speed is increased and a section in which the speed is reduced back to the original speed during a single movement in which the supply control part 320 moves from the bottom to the top and back to the bottom.

Meanwhile, the motor control part 333 may be used to control the rpm of the shaft by interlocking with a gear between the crank 332 and the shaft. The number of times of speed control described above may be variously changed.

The supply driving part 330 according to an example vertically moves the supply control part 320 in which the powder 10 stays, thus generating inertia. When the moving direction of the supply control part 320 is reversed from the top to the bottom or from the bottom to the top by the supply driving part 330, the staying powder 10 is abruptly moved and is stayed and agglomerated in the control passage 322 of the supply control part 320. Thereafter, the agglomerated powder 10 is dispersed and is moved to the supply passage 323 over the control passage 322. Moreover, the speed of the supply control part 320 which is moved from the bottom to the top and then from the top to the bottom is changed by the motor control part 333, thus providing irregular inertia. The irregular inertia may increase a phenomenon in which the agglomerated powder 10 is dispersed, so it is possible to suppress the adaptation of the powder 10 due to regular inertia. The adaptation of the powder 10 refers to a phenomenon (closed model) in which the powder 10 affected by regular external force is adapted to the regularity, so that the powder 10 is not dispersed or the fluidization phenomenon of the powder 10. The adaptation of the powder 10 according to the present disclosure is based on the fluidization phenomenon of the powder 10.

The motor 331 performs a rotary motion and the supply control part 320 connected to the crank 332 performs a linear motion. In this case, even when the motor 331 operates at a constant speed, the supply control part 320 connected to the crank 332 continuously changes a movement direction and a movement speed. In this situation, when the rotary motion of the motor 331 is divided into several sections having different average speeds, a continuous change in acceleration is imparted to the supply control part 320. Such a change in acceleration continuously makes the flow of the powder 10. In the section where it becomes slower than the average speed, the mobility of the powder is reduced. In the section where the average speed is high, the mobility of the powder is increased again, so that the powder is discharged. When the supply control part 320 is moved by a continuous acceleration and a change in acceleration, the amount of powder supplied per hour becomes stable.

Meanwhile, as shown in FIG. 4, the control period 20 of the motor control part 333 may be set to move the supply control part 320 by a distance which is obtained by excluding a predetermined distance from a total distance in the process of reciprocating the supply control part 320. In detail, the control period 20 is set to perform a movement by a distance which is 70% to 99% of the total distance by which the supply control part 320 reciprocates. For instance, assuming that an upward moving distance of the supply control part 320 is 5 mm and a downward moving distance thereof is 5 mm, and a total moving distance is 1 cm, the motor control part 333 may move the supply control part 320 by 7 mm to 9.9 mm according to the control period 20. In other words, the supply control part 320 moves from the bottom to the top and then moves to the bottom by 2 mm to 4.9 mm. According to a new control period 20, the supply control part starts to move from a point of 2 mm to 4.9 mm again. Such a motor control part 333 may make the movement of the supply control part 320 more irregular, thus continuing to disperse the powder 10, and suppressing the fluidization phenomenon of the powder 10.

Meanwhile, after one control period 20 is finished, the moving direction of a new control period 20 may be reversed. The starting direction of the control period 20 may be irregularly set.

On the other hand, the control period 20 may be set such that the supply control part 320 further moves by a distance of 1% to 30% of the total reciprocating distance and runs at a constant speed for a predetermined time after the control period 20, and then the control period 20 may be started.

Meanwhile, when the supply control part 320 is rotated by the supply driving part 330, angular speed is not always constant. When the supply control part moves linearly, linear speed is not always constant. The speed is changed with time. This may be divided into several ranges according to average speed, and the control period 20 may be set according to the time width of these ranges. The external force is applied to the supply control part 320 by a difference between average speeds. Further, by adjusting the average speed for each section, a total amount of powder supplied per hour may be adjusted. In the case of driving without such a change in speed, the powder supply part may be repeatedly moved, and a closed model in which the powder stays in the powder supply part does not occur. In this case, the powder continuously flows without being affected by the supply part, and the exact supply amount of powder is not controlled. Therefore, a section where a difference in average speed occurs is formed so as to create time when the powder momentarily stays in the supply part.

Meanwhile, when a section is divided into several sections having different average speeds of the motor 331, a continuous change in acceleration is provided to the powder 10. Such a change in acceleration suppresses the fluidization phenomenon of the powder 10 in the supply control part 320, thus preventing the residual flow of the powder 10 and causing the powder 10 to be uniformly and continuously moved. If the average speed of the motor 331 is decreased, the mobility of the powder 10 is reduced. If the average speed is increased, the powder 10 may be smoothly moved. This makes the force of movement provided to the powder 10 irregular, thus suppressing a phenomenon in which the particles of the powder 10 are adapted to the same movement, so the powder particles stay or are agglomerated by Van der Waals force, and suppressing the fluidization phenomenon of the powder 10. As a result, when the supply driving part 330 is moved by continuous acceleration and a change in acceleration, the residual flow of the powder 10 is suppressed, thus making the supply amount of the powder 10 per hour stable.

Meanwhile, the supply driving part 330 may be implemented using a piezometer control part which controls an operation range in a process of reciprocating the piezometer and a movement period for increasing and reducing the speed.

The above-described supply device 300 may finely adjust the amount of the powder 10 supplied to the powder discharge part 100 through the amount of the powder 10 discharged through the control period 20. The supply device 300 may suppress a problem in which the powder 10 is erroneously discharged by the supply control part 320 due to external shocks or shakes in a transverse direction.

The above-described supply device 300 may adjust the discharge amount of the powder 10 only by the control of the supply driving part 330 regardless of the amount of the powder 10 introduced into the supply control part 320. In other words, even if the failure of the storage part 310 which stores the amount of the powder 10 occurs, a fixed amount of powder 10 may be discharged.

When describing the operational relationship of the supply control part 320 of the above-described supply device 300, the powder 10 stays and does not flow in the case that there is no force from the supply driving part 330. Thereafter, when the supply of the powder 10 is required, the supply driving part 330 is operated to break up the staying powder 10 and thereby create the flow of the powder 10.

The supply driving part 330 may move in x, y, and z axes in space, and may also rotate in yaw, roll, and pitch axes. All movements may break the stagnation of the powder 10 stored in the supply control part 320, thus causing the powder 10 to move. A vibration generator using a vibration motor and a piezo may also break the stagnation of the powder 10, thus causing the powder 10 to move.

In other words, the discharge amount of the powder 10 is adjusted according to the areas of the inlet passage 321, the control passage 322, and the supply passage 323 included in the supply control part 320, the movement speed of the supply driving part 330 and the displacement of the repeated movement.

The above-described supply device 300 is a device for discharging a predetermined amount of powder 10 positioned in the supply control part 320 by the supply driving part 330, and the precision and accuracy of the supply amount per hour vary depending on the shape and size of the inlet passage 321, the control passage 322, and the supply passage 323 included in the supply control part 320. Further, since the path through which the powder 10 is discharged from the supply control part 320 is very short, a reaction speed is fast. When the reaction speed refers to how quickly it may be adjusted to a desired supply amount per hour, the supply device according to the present disclosure is fast in reaction speed because it is affected by the movement speed and acceleration of the supply driving part 330. This may discharge a desired amount of powder 10 when a change in supply amount per hour is required.

Meanwhile, the control period 20 may be one period movement or may be divided on the basis of time. At this time, the amount of the powder 10 supplied in one period is determined by the sectional shape of the passage of the supply control part 320, and affects the precision of the supply device 300. When the sectional size of the passage of the supply control part 320 decreases, an amount supplied in one period is reduced, so that the precision is increased but a maximum supply amount per hour is decreased due to a limit on movement which may be imparted by the supply driving part 330. On the contrary, when the sectional size of the passage of the supply control part 320 increases, the precision of the supply amount per hour is decreased but a maximum supply amount per hour is increased.

Since the supply device 300 is a device for discharging a certain percentage of the powder 10 filled in the supply control part 320 by the external supply passage 323, the precision and accuracy of a hourly supply amount vary depending on the internal shape of the supply control part 320. Further, since it takes a very short time for the powder 10 to be discharged from the supply control part 320, the reaction speed is increased compared to other types of supply devices.

When the reaction speed refers to how quickly it may be adjusted to a desired supply amount per hour according to a user's instruction, the present disclosure is fast in reaction speed because the amount of the powder 10 positioned in the supply device 300 is affected by the movement speed and acceleration of the supply driving part 330 in a state where it is not changed significantly for each period and each situation. This is useful when a change in supply amount per hour is required in the process of using the powder 10.

Even in the same movement of the supply driving part 330, the discharge amount of the powder 10 may be changed according to a difference in air pressure between the storage part 310 and the supply control part 320.

When there is no external force as essential conditions of the path through which the powder 10 moves, the supplied powder 10 should not flow into the supply passage 323. The movement path of the powder 10 should be determined in shape and size to satisfy these conditions. In general, the supplied powder 10 may not flow, but fluid having good flowability, such as air, becomes in a state in which it can easily flow. When a size is extremely small, air or like may become in a state where it may not flow by the Van der Waals force.

The control passage 322 of the supply control part 320 is generally shaped to prevent the powder 10 supplied to the inlet passage 321 from flowing to the supply passage 323. At this time, the inlet passage 321, the control passage 322, and the supply passage 323 may be provided as spaces which are not separated by other structures and devices.

Meanwhile, the supply device 300 according to the present disclosure may freely change the direction of the control passage 322 and the supply passage 323. At this time, the movement direction of the supply control part 320 may be freely changed through the supply driving part 330 according to the direction of the control passage 322 and the supply passage 323.

Although the present invention was described with reference to specific embodiments shown in the drawings, it is apparent to those skilled in the art that the present invention may be changed and modified in various ways without departing from the scope of the present invention, which is described in the following claims.

The invention claimed is:

1. A supply device for supplying powder, the supply device comprising:
   a storage part in which the powder is stored;
   a supply control part which is provided such that the stored powder flows therein and remains therein, and from which the powder is discharged by external force; and
   a supply driving part configured to provide force to the supply control part,
   wherein the supply control part includes:
      an inlet passage through which the powder is introduced from the storage part;
      a control passage connected to a bottom end of the inlet passage and being inclined upwards in a transverse direction such that the powder introduced from the inlet passage is stayed; and
      a supply passage connected to a top end of the control passage, facing downwards to induce the powder passing through the control passage to naturally falls therethrough,
   wherein the supply driving part is configured to move the supply control part by the force with a control period in which a moving speed of the supply control part is increased and then reduced in a process of reciprocating the supply control part, thereby generating irregular inertia, such that a stay of the powder in the control passage is broken up by a movement of the supply control part, thereby flowing the powder through the supply passage.

2. The supply device of claim 1, wherein the supply driving part comprises:
   a motor;
   a crank performing a reciprocating movement by rotating force of the motor; and
   a motor control part controlling the control period in which a moving speed of the motor is increased and then reduced in the process of reciprocating the supply control part.

3. The supply device of claim 1, wherein the control period is set to perform the movement by a distance which is obtained by excluding or adding a predetermined distance from or to a total distance in the process of reciprocating the supply control part.

4. A supply device for supplying powder, the supply device comprising:
   a storage part in which the powder is stored;
   a supply control part which is provided such that the stored powder flows therein and remains therein, and from which the powder is discharged by external force; and
   a supply driving part which provides force to the supply control part,
   wherein the supply driving part comprises a control period in which a moving speed is increased and then reduced in a process of reciprocating the supply control part, and wherein the control period is set to perform a movement by a distance which is obtained by excluding or adding a predetermined distance from or to a total distance in the process of reciprocating the supply control part.

* * * * *